United States Patent [19]
Fischer

[11] Patent Number: 5,366,247
[45] Date of Patent: Nov. 22, 1994

[54] VEHICLE SPLASHGUARD

[76] Inventor: Kenneth J. Fischer, 208 Lenox Ave., Apt. 3, Pittsburgh, Pa. 15221

[21] Appl. No.: 58,216

[22] Filed: May 10, 1993

[51] Int. Cl.[5] .................................................. B62D 25/16
[52] U.S. Cl. ................................... 280/851; D12/185
[58] Field of Search ................ 280/851, 152.3, 848, 280/849; D12/185

[56] References Cited

U.S. PATENT DOCUMENTS

| | | | |
|---|---|---|---|
| 2,546,781 | 3/1951 | Rheeling | 280/851 |
| 2,571,413 | 10/1951 | Botz | 280/851 |
| 2,699,955 | 1/1955 | Eaves et al. | 280/851 |
| 3,088,751 | 5/1963 | Barry et al. | 280/851 |
| 4,382,606 | 5/1983 | Lightle et al. | 280/851 |
| 4,735,428 | 4/1988 | Antekeier | 280/851 X |
| 4,796,905 | 1/1989 | Sullivan | 280/851 |
| 4,796,906 | 1/1989 | Sullivan | 280/851 |
| 5,205,590 | 4/1993 | Drabing et al. | 280/851 |

FOREIGN PATENT DOCUMENTS 450190  4/1968  Switzerland ................ 280/851

*Primary Examiner*—Richard M. Camby
*Assistant Examiner*—Carla Mattix
*Attorney, Agent, or Firm*—Paul E. Milliken; Lee A. Germain

[57] ABSTRACT

A configuration for a splashguard as may be mounted rearwardly of at least one vehicle wheel to deflect and redirect water and other substances being sprayed rearwardly by a rotating tire. The splashguard comprises a rectangularly shaped body having a plurality of angularly disposed vanes or louvers which function to deflect and redirect water droplets and other materials downwardly upward the roadway surface rather than sidewardly or rearwardly into the paths of following traffic.

24 Claims, 5 Drawing Sheets

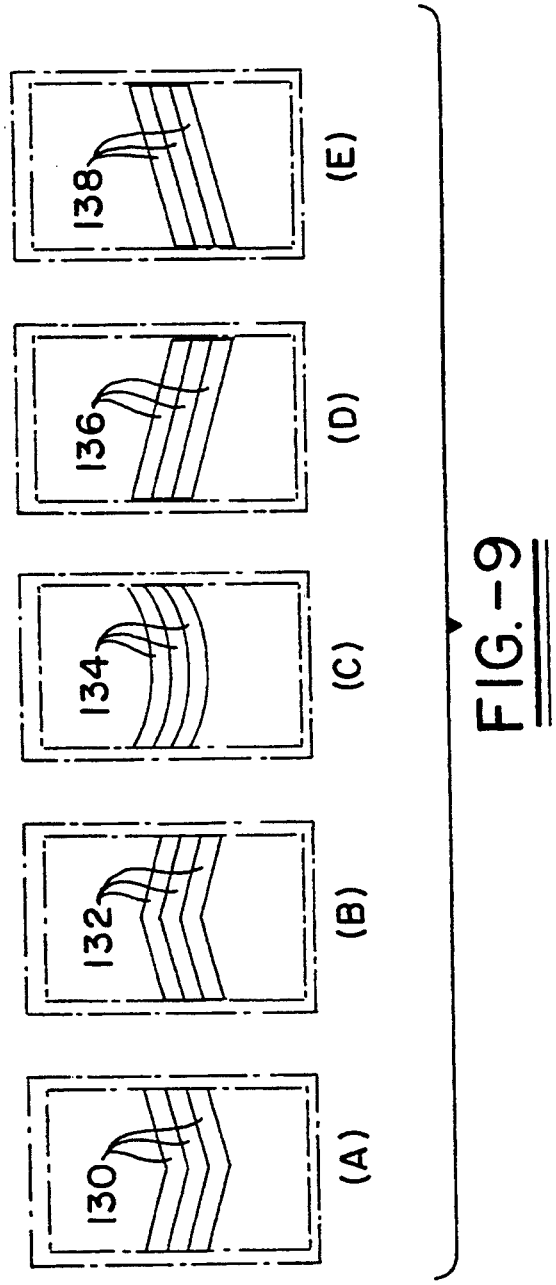

5,366,247

VEHICLE SPLASHGUARD

FIELD OF THE INVENTION

The present invention pertains generally to devices which may be mounted on road vehicles, rearwardly of their wheel housings, to limit the extent that various types of road debris are thrown rearwardly by rotating tires.

More particularly, this invention is directed to a splashguard device which is mounted to the rearward end of vehicle wheel housings to contain and redirect various substances being sprayed rearwardly by the tires.

Specifically, the invention provides a configuration for a splashguard which comprises a plurality of spaced-apart and angularly disposed vane members or louvers which function to block and redirect water, water vapor, and other substances on a roadbed which may be sprayed rearwardly by the action of rotating tires.

BACKGROUND OF THE INVENTION

The recognized terminology "mudguard" was more than likely coined at a time when roadbeds were comprised primarily of various types of loose soils as the dictionary definition of the term states that a mudguard is ". . . a cover or shield over the wheel of a bicycle, automobile, etc. to protect against mud thrown up by the wheel . . . " (Webster's Unabridged Dictionary, 1983). The present invention is to a mudguard type of device but the terminology "splashguard" will hereinafter be used inasmuch as its function is to protect against water and similar type substances which may be sprayed rearwardly by the rotating tires of a road vehicle.

In contrast to earlier times, present roadway surfaces may be comprised of concrete or a macadamized composition of broken stones in a tar or asphalt binder. These surfaces while being relatively smooth, exhibit imperfections which tend to hold various amounts of moisture or rainwater when this condition exists. Therefore, vehicles traversing the roadway will create a spray of water or a cloud of water vapor behind them which is a recognized hazard to other vehicles. The situation is further aggravated by the advent of larger and more powerful tractors which are capable of pulling larger trailers and even multiple trailers in a tandum arrangement. These very large vehicles, of course, have multiple dual wheel assemblies which generate volumes of water spray and/or vapor clouds in both rearwardly and sidewardly directions of travel.

In view of the above-described situation, a recognized need exists in this art for a device which will reduce the water spray and/or vapor cloud generated behind large road vehicles to thus increase the safety for all traversing the roadway.

It is in accordance with one aspect of the present invention an object to provide a splashguard device which effectively redirects water, water vapor, and other types of similar substances which may be propelled into it to a direction downwardly toward the roadway surface where it will not interfere with the visibility of traffic which may be following the vehicle having the splashguards mounted thereon.

According to another aspect of the invention it is an object to provide a splashguard which has a body comprised of a plurality of substantially horizontal and angularly disposed vanes which will function to redirect water and other liquid substances being thrown up at it by rotating vehicle tires.

In accordance with another aspect of the invention it is an object to provide a splashguard structure which may be varied in length and thus be adapted to fit most vehicle wheel sizes and/or configurations.

According to still another aspect of the invention it is an objective to configure a vehicle splashguard which may be molded of conventional polymeric materials and in various widths and lengths to accomodate most road vehicles on which such splashguards may be mounted.

SUMMARY OF THE INVENTION

The above-mentioned and other objects and advantages of the present invention are accomplished in a splashguard for mounting at a rearwardly position of at least one rotating wheel of a road vehicle to contain and redirect various fluid substances which may be sprayed thereon by a rotating tire, the splashguard being characterized by a body comprised of a plurality of vane members interposed between two side members and angularly disposed at acute angles with reference to the plane of the splashguard body, the vanes functioning to redirect substances which may be impinged thereon in a direction downwardly toward the roadway surface where such substances may be dissipated.

BRIEF DESCRIPTION OF THE DRAWINGS

The various features and advantages of the present invention will become apparent and better appreciated from a consideration of the following detailed description when taken in conjunction with the accompanying drawings, in the several figures in which like-reference numerals are used to identify like parts or elements and wherein:

FIG. 9 schematically illustrates via figures A-E various alternative configurations for vane members which may be applied to the embodiments illustrated in FIGS. 1 and 3.

DETAILED DESCRIPTION OF THE INVENTION

Figure 2:
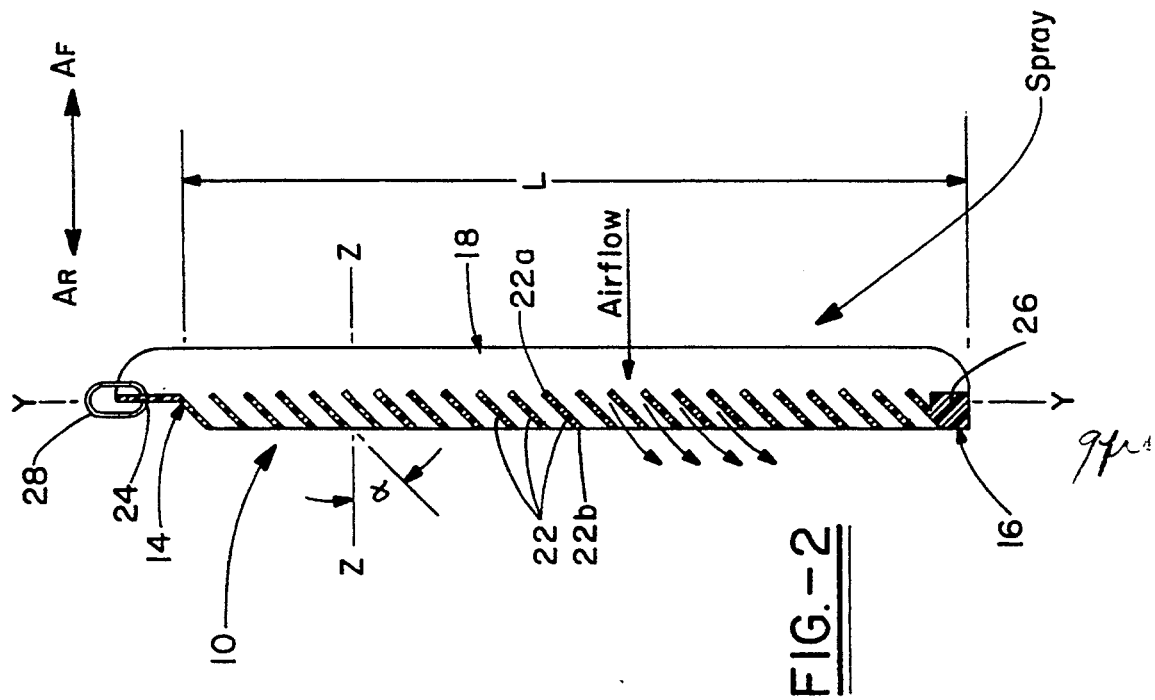
FIG. 2 is a side elevational view, in cross-section as may be taken at line 2—2 of FIG. 1, illustrating a vane configuration according to the invention.
Figure 1:
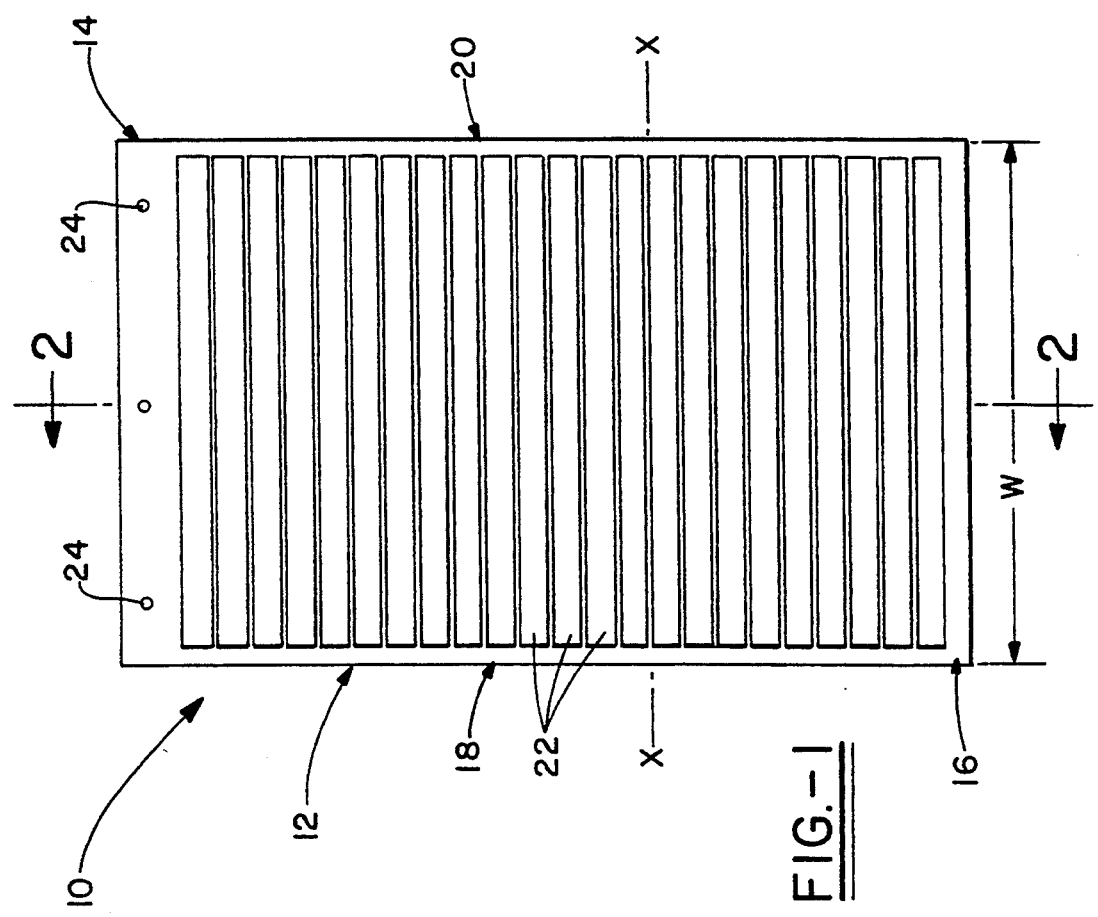
FIG. 1 is a plan view of the rearwardly-directed surface of a splashguard forming a first embodiment of the present invention.

Referring to FIGS. 1 and 2 of the drawings, a first embodiment of a splashguard in accordance with the present invention is illustrated and generally indicated by reference numeral 10. The splashguard 10 is very generally of a rectangular shape and has a body 12 which may be defined by a top end 14, a bottom end 16, and parallel side members 18 and 20 respectively. The splashguard 10 is of a unitary type construction fabricated of any suitable polymeric material, i.e., plastic or elastomeric material as these are defined and known in the art and which will meet the duty requirements in the intended application of the invention. The particular application, of course, is a mounting of the splashguard 10 at an in-line position with respect to at least one wheel of a road vehicle (not shown) to control and redirect various liquid substances which may be sprayed rearwardly by rotating tires of the vehicle.

The splashguard 10 is characterized by a plurality of integrally formed vane members 22 which extend from one side 18 to the opposite side 20 and these are in a substantially horizontal orientation and in vertically spaced-apart positions one with respect to any other. In this respect and for the purposes of this description, the splashguard 10 will be defined with reference to a vertical Y-axis through the lengthwise extent of the body 12, an orthogonal X-axis through the widthwise extent of the body 12, and a Z-axis orthogonal to both the Y and X axes and through the depth or thickness extent in the forward and rearward directions of the body 12. As shown in FIG. 1 of the drawings, the vanes 22 may be disposed in parallel orientations with respect to the X-axis and in spaced-apart positions with respect to the Y-axis.

Figure 5:
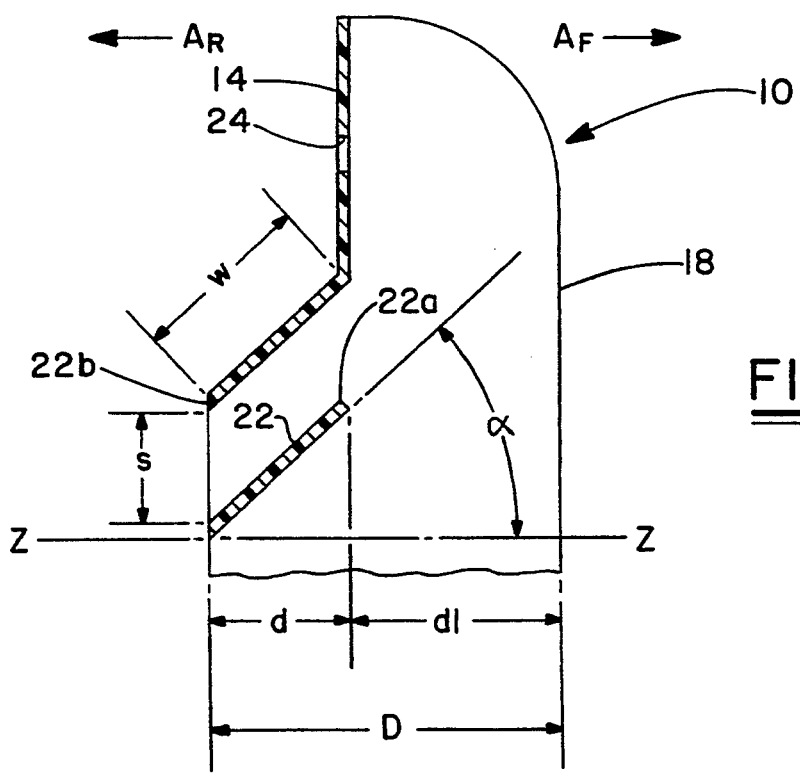
FIG. 5 is a side elevational view, in vertical cross-section, of a portion of the top end of the splashguard and illustrating various specifications thereof.

More specifically with reference to FIG. 2 and also now to FIG. 5, the vanes 22 are positioned at an acute angle with reference to an orthogonal vertical plane of the body 12, that is, with respect to a Y-plane along the X-axis with the angle $\alpha$ extending along the Z-axis. Each of the vanes 22 will exhibit a width extent "w", a depth extent "d", and a spacing between any two adjacent vanes of "s". It will be recognized from a consideration of FIG. 5 of the drawings, that the spacing dimension "s" may also be defined with reference to a vertical length of one side of a right triangle wherein the opposite sides are "w" and "d" which define the acute included angle $\alpha$. From this and for particular values of the angle $\alpha$ and vane width "w", the dimension "s" may be determined by the relationship $s = w \sin \alpha$ and the dimension "d" may be determined by the relationship $d = w \cos \alpha$. In this respect also, the "s" and "d" dimensions may be chosen such that the leading edge 22a of a vane 22 is slightly higher than the trailing edge 22b of a vane above it. In this configuration, there will be no straight line pathway in the Z-axis direction through the vane area of the splashguard body 12. The splashguard 10 may be further characterized by side members 18 and 20 which extend forwardly in the direction of reference arrow AF a distance indicated at "d1" in the figure. The total dimension of each of the sides 18 and 20 will be a dimension "D" which is equal to (d+d1).

In a preferred configuration of the splashguard 10, a length "L" of the body 12 in the area of the vanes 22 which excludes the top end 14 will be within the range of 24–36 inches. This will, of course, depend upon the particular wheel dimensions of the vehicle on which the splashguard is to be mounted for the most effective operation. In addition to this, the width extent "W" will be within the range of 20–30 inches and, more preferably, it will be about 25 inches so as to accomodate most dual wheel configurations found on these types of vehicles.

The acute angle $\alpha$ of the vanes 22 will preferably be within the range of 35°–55° and, more preferably, it will be within the range of 40°–50°. In this respect and by way of example only, the applicant has found that an acute angle of about 42° functioned in the manner intended for the splashguard 10. As shown in FIG. 5 and mentioned earlier in this description, the side members 18 and 20 extend forwardly beyond the depth dimension "d" of the vanes 22. In the preferred configuration of the splashguard 10, the total depth "D" will be about 4 inches while the dimension "d" will be about 1.5 inches. From this and the showing of FIG. 2, it will be recognized that any type of mounting using a plurality of mounting holes 24 through the top end 14 of the body 12 will be made in a plane that is located rearwardly of a parallel plane positioned on a vertical centerline through either of the side members 18 and 20. In this arrangement, the center of gravity (c.g.) of the splashguard 10 will be located such as to tend to hang the splashguard in a substantially vertical orientation. This is necessary because the total weight of the material which comprises the plurality of vanes 22 is greater than the weight of material which comprises the forwardly extending portions of the sides which have dimensions indicated at "d1". In addition and because the splashguard 10 will be affected by wind and water forces directed rearwardly and acting on the body 12 which will tend to rotate the bottom end 16 in the direction of reference arrow $A_R$. an additional body of structural material 26 may be provided in the bottom end 16. This will concentrate more weight at the bottom end and help offset any wind and/or water forces acting on the forwardly-directed surfaces of the splashguard 10.

It is anticipated that the splashguard 10 may be mounted to various types and sizes of vehicles using well-known fastening means and/or methods. Preferably it will be mounted to a vehicle via at least two or more ring type fasteners 28 which are carried within the holes 24 in the top end 14 of the splashguard body 12. The rings 28 may be fastened to or carried on a bar or like member on the vehicle such that the splashguard 10 will be free to rotate about the mounting. It can be seen that when a ring-type fastening means is utilized, the splashguard 10 is free to swing rearwardly by action of wind and/or water forces against it and that a concentration of weight at the bottom end 16 will tend to cancel out some of this action.

In the operation of the splashguard 10, it will be appreciated that the wind and water forces which are directed into the vane area will be redirected in a direction downwardly toward the roadway surface rather than rearwardly and upwardly into the pathway of other following vehicles. In addition, it will be recognized that the side members 18 and 20 will be effective in reducing liquid or vapor spray in a direction transversely to the direction of travel of the vehicle.

As hereinbefore mentioned, the splashguard 10 may be molded as a unitary structure using conventionally known and practiced molding techniques and/or equipments. In this respect also, the splashguard 10 may be made in multiple and various lengths "L" such as to accomodate most wheel diameters and types. The invention, therefore, is not considered limited to any dimensions which may be taken from this description as these may be varied to meet various vehicle configurations and/or specifications.

Figure 4:
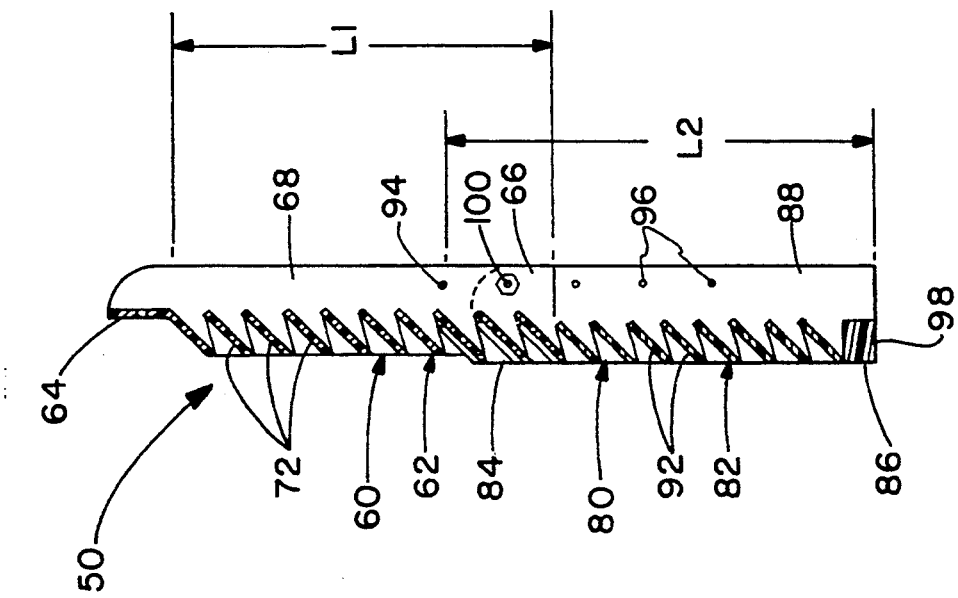
FIG. 4 is side elevational view, in cross-section as may be taken at line 4—4 of FIG. 3, illustrating a vane configuration for a two-section splashguard comprising this second embodiment.
Figure 3:
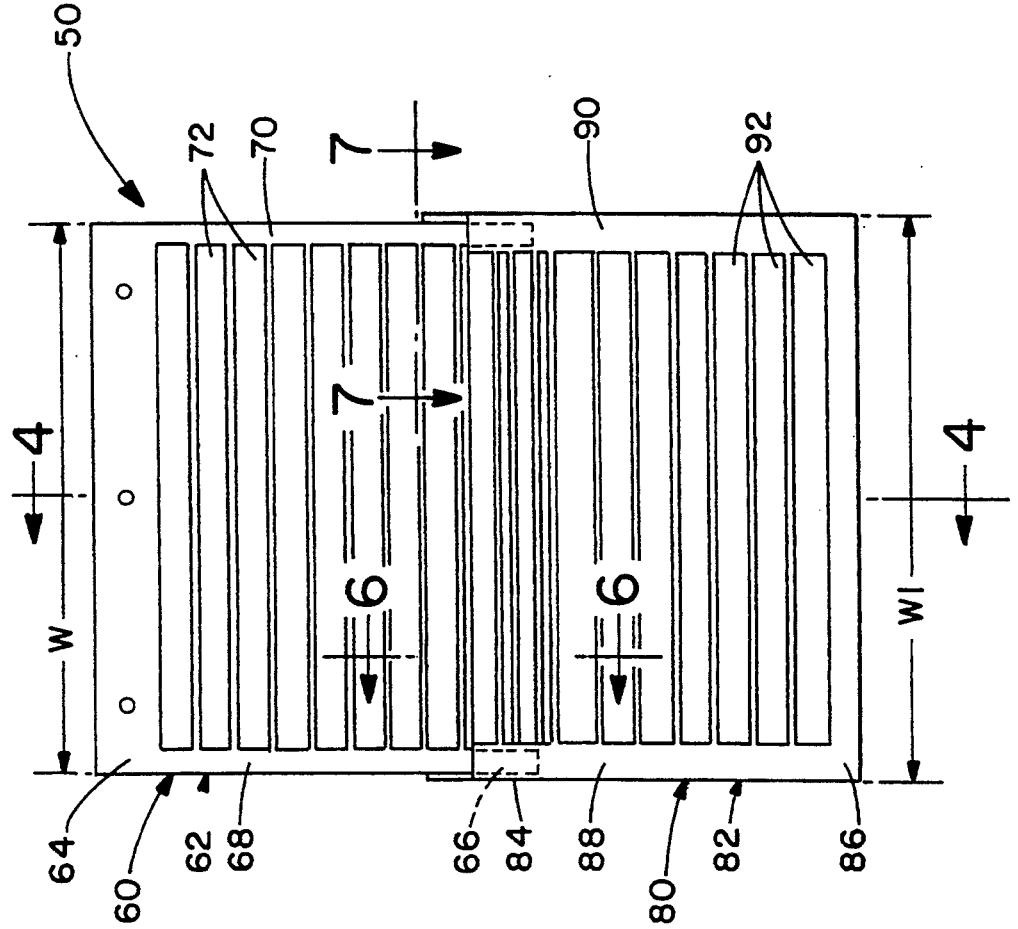
FIG. 3 is a plan view of the rearwardly-directed surface of a splashguard forming a second embodiment of the present invention.

Referring to FIGS. 3 and 4 of the drawings, a second embodiment of the invention is illustrated and generally indicated by reference numeral 50. The splashguard 50 will function in the same manner as the splashguard 10 but this configuration comprises a two-part assembly which may be adjusted in length "L" to meet various wheel dimensions. The splashguard 50 is comprised of a top splashguard section 60 and a bottom splashguard section 80 and these are coupled together in a nesting relationship to form a unitary body. The top section 60 is configured for attachment to a vehicle while the bottom section 80 is configured to be positioned and affixed onto the top section so as to vary its relationship with the roadway surface.

The splashguard section 60 is substantially identical to the splashguard 10 in all of its dimensions except that its bottom end does not terminate such as to include any additional weight of material. The splashguard 60 comprises a body 62 which may be defined by a top end 64, a bottom end 66, and side members 68 and 70. While the width dimension "W" may vary in the manner described with reference to the splashguard 10, the length dimension "L" is shorter by a specific amount. The length dimension of the splashguard section 60 is indicated at "L1" in the figures and it will preferably be at least one-half the length "L" and its bottom end 66 will be terminated at one of a plurality of vane members 72. In other words and as alluded to, the bottom end 66 will not include any additional structural material for added weight as hereinbefore described with respect to the splashguard 10. The vane members 72 are similar to the vane members 22 of splashguard 10, i.e., they are ,angularly disposed within the body 62 at an angle α which may be within the acute angle ranges hereinbefore described.

The splashguard section 80 is also similarly constructed except that it is characterized by a body 82 having a top end 84 which is not a mounting flange but rather is terminated at one of its vane members 92. The width dimension "W1" is wider than the width dimension "W" of the splashguard section 60 and its length dimension "L2" is at least one-half the length "L" of a splashguard 10. The bottom end 86 is terminated similarly to the bottom end 16 in that it may include an additional amount of structural material 98 so as to concentrate more weight at the bottom end 86.

As should be clearly evident from the FIG. 3 and 4 illustrations, the bottom splashguard section 80 has a portion of its top end 84 in overlapped and nesting relationship with the bottom end 66 of the splashguard section 60. Each of the splashguard sections 60 and 80 will have a plurality of fastening holes 94 and 96 respectively and these will be identically spaced vertically such that a hole 94 in the section 60 side members 68 and 70 will be in registration with a hole 96 in the section 80 side members 88 and 90 when the two sections are in nested relationship. Any conventional fastening means 100 may be used to maintain the sections 60 and 80 in a face-to-face contacting and nested relationship. From this description, it will be appreciated that the bottom splashguard section 80 may be moved up or down with respect to the top section 60 and in this manner also be moved in relative position with respect to a roadway surface. The splashguard 50, therefore, may be adapted for use on any vehicle configuration including different wheel sizes.

Figure 6:
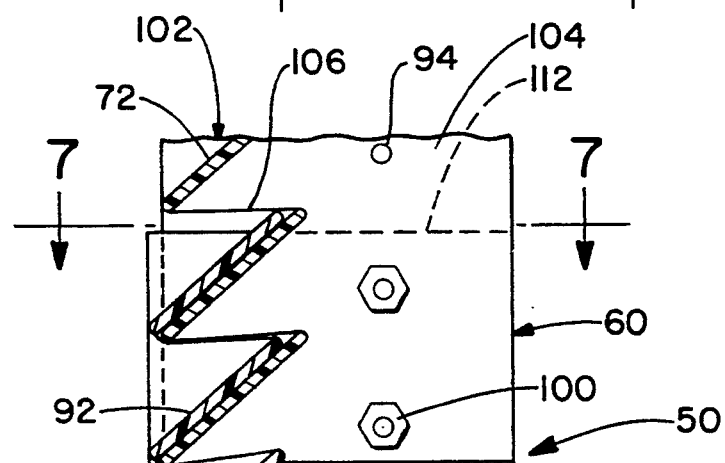
FIG. 6 is a side elevational view, in vertical cross-section as may be taken at line 6—6 of FIG. 3, illustrating a nesting arrangement of splashguard vanes.
Figure 7:
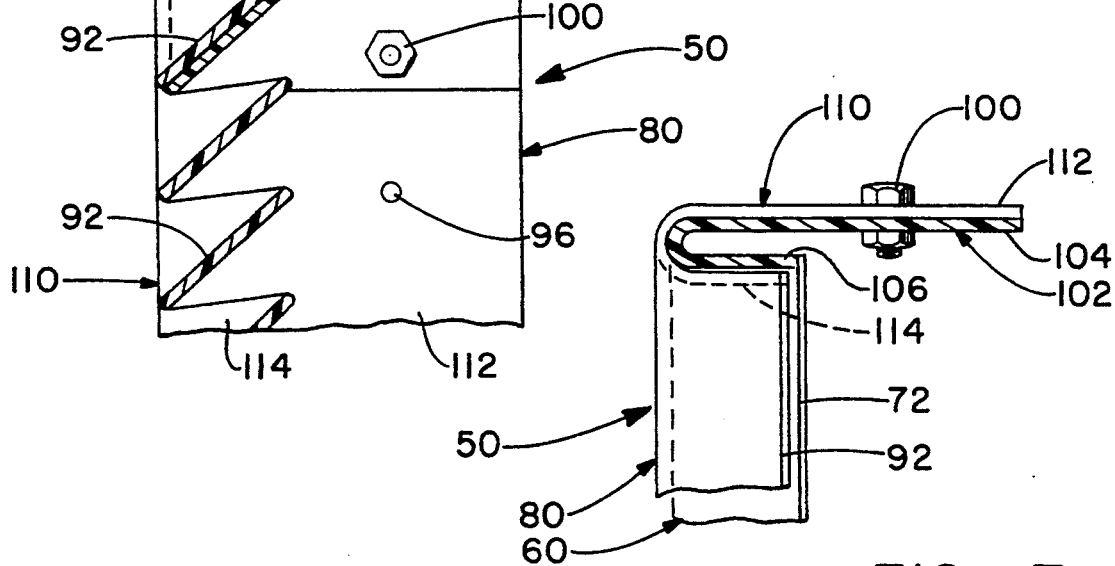
FIG. 7 is a top view, in partial cross-section as may be taken at line 7—7 of FIG. 3, illustrating an interlocked and nesting configuration for separate top and bottom sections which form the second embodiment of the invention.
Figure 8:
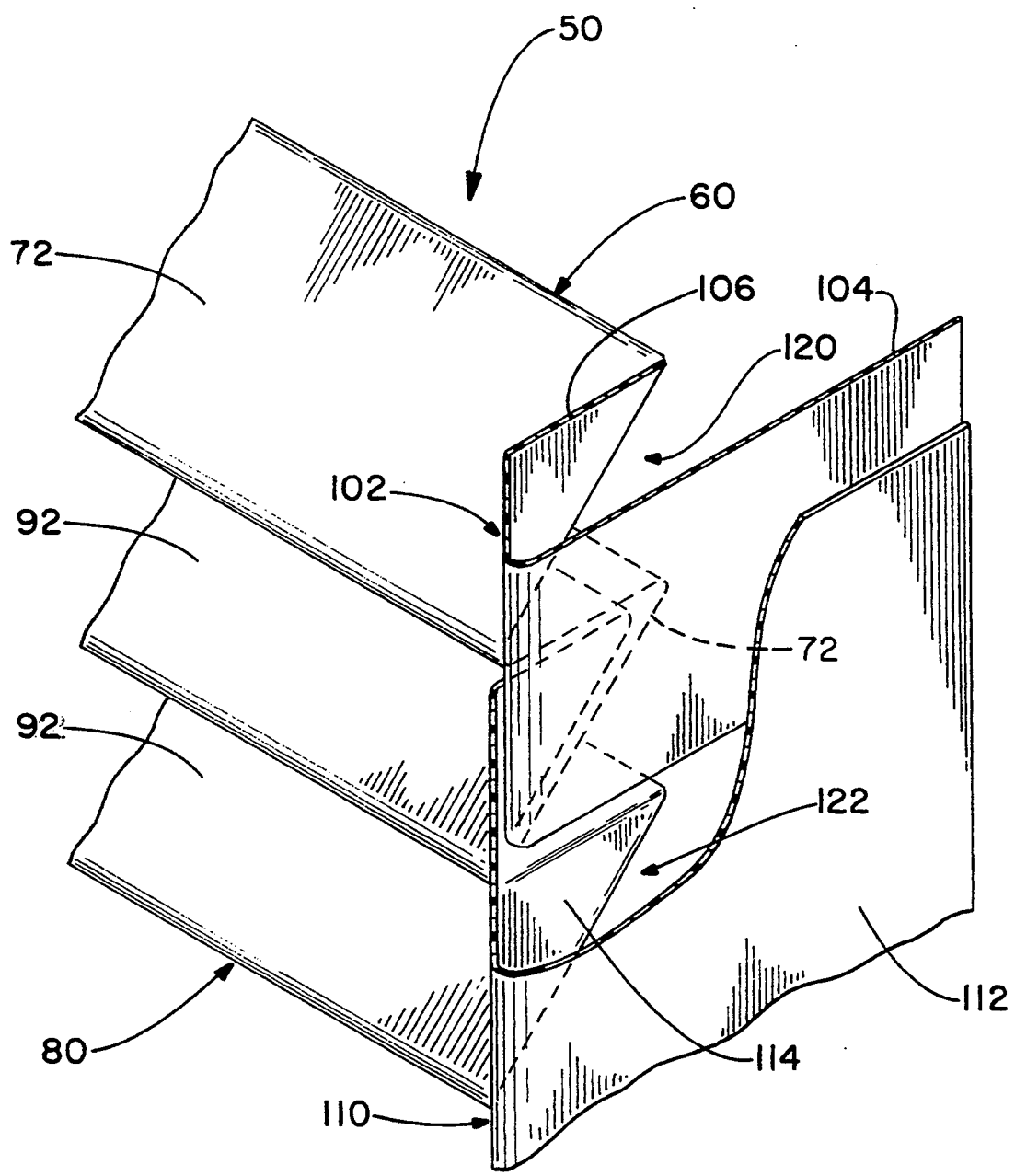
FIG. 8 is a partial perspective view as may be taken from one side of the splashguard shown in FIG. 3 illustrating the nesting configuration of the two-section splashguard; and 00

Referring now to FIGS. 6, 7, and 8 of the drawings, a particular configuration of the splashguard sections 60 and 80 are illustrated, and this, with respect to their respective side members 68,70 and 88,90. In the figures, only a single side member for each section is illustrated, it being understood that the opposite side members of each will be identically configured. The section 60 will have side members 68,70 comprised of substantially U-shaped channels 102 having an outboard leg 104 and an inboard leg 106. The outboard leg 104 exhibits a dimension "D" while the inboard leg 106 exhibits a dimension "d" which is the depth extent of a vane member 72 as hereinbefore described. The two legs 104 and 106 form a side member 68 or 70 of the splashguard section 60 and the plurality of vanes 72 are affixed to, or form an integral part of, the inboard leg 106 as illustrated.

In a similar manner, the splashguard section 80 will have side members 88 and 90 comprised of a substantially U-shaped channel 110. Each of the channels 110 are also characterized by an outboard leg 112 which exhibits a dimension "D" in the Z-axis direction and is connected to an inboard leg 114 which has a dimension "d" as these dimensions have been described with reference to FIG. 5. The two legs 112 and 114 thus form the side members 88,90 and the plurality of vanes 92 are affixed to, or form an integral part of, the inboard leg 114.

It will, of course, be recognized that the splashguard sections 60,80 must have their respective inboard legs 106 and 114 configured such that a nesting relationship may be realized. This is accomplished by forming the inboard legs 106 of section 60 and the inboard legs 114 of section 80 with substantially triangular cutout areas 120 and 122 as shown in FIG. 7. This configuration allows one to slide the one section into the other without any interference of the inboard legs of one with the vanes of the other.

The splashguard sections 60 and 80 will vary in some respects, but primarily, with respect to the width dimension "W" as this dimension has been describer hereinbefore. As clearly evident from the showing in FIG. 7, a gap which is formed by the U-channel legs 112 and 114 is wider than a gap formed by the U-channel legs 104 and 106. This is necessary so that the splashguard section 80 may be nested over the splashguard section 60 by their respective end members 68,70 and 88,90. In this respect also, it can be seen from FIGS. 6 and 8 that the vanes 92 of the splashguard section 80 are supported by the vanes 72 of the splashguard section 60 when the two sections are in nested arrangement. The two sections, therefore, are maintained in this arrangement by way of the fastening means 100 at the forward position of the U-shaped channel outboard legs 104 and 112 and the interengagement of their respective vane members 72 and 92.

Referring now to FIG. 9 of the drawings, various configurations of vane members are illustrated as these may be applied to the two embodiments of the invention illustrated in FIGS. 1–4. The vane members are shown in solid lines as these are arranged on splashguard bodies which are only illustrated via ghost dot-dashed lines. In illustrations "A" and "B" of FIG. 9, chevron or V-shaped vane members 130 and 132 are shown. While only three vanes are illustrated, it should be understood that the vanes will occupy a vertical extent of the splashguard body as hereinbefore described with reference to FIGS. 1 and 3. In illustration "C", semicircular vanes 134 are shown and in illustrations "D" and "E" angled vanes 136 and 138 are shown. The vane members 130, 132, and 134 may be applied to splashguard bodies which can be used on either side of a vehicle while it can be seen that the vanes 136 and 138 will preferably be used on a single side. For example, if one is viewing the splashguard bodies of illustrations "D" and "E" from a rearward vantage, the one having vane members 136 will preferably be mounted on the vehicle on the left side while the one having vane members 138 will be mounted on the right side. The arrangement is the preferred one because the angular arrangement of the vanes will direct fluids and other substances toward the center of the vehicle rather than outwardly and sideways. In this respect, all of the vane members 130, 132, 134, 136, and 138 are at an angle α as hereinbefore described and all of these may be applied to the single and double section embodiments described with reference to FIGS. 1 and 3 of the drawings.

An important advantage of the invention which should be mentioned is that even though the vanes or louvers 22, 72, 92, and 130 through 138 deflect road water downwardly so that it is not thrown rearwardly by the vehicle tire onto following vehicles, the spaces between the louvers permit the air pressure build-up at the front side of the splashguard 10 or 50 to be vented through to the back side thereby reducing a kiting effect or the tendancy for the splashguard to lean rearwardly at the bottom when it is suspended on a fast moving vehicle and allow a greater amount of water to pass beneath the splashguard. The air passing between the louvers 22, 72, 92, and 130 through 138 tends to equalize the air pressure on both sides of the splashguard and maintain it in a substantially vertical position on the vehicle even when the vehicle is moving forward at a fast rate of speed. The vertical position of the spashguard provides a more effective control of the water thrown by a tire than if the spashguard were leaning rearwardly at the bottom.

From the foregoing description and a consideration of the various drawing figures, it may be seen that the present invention provides a much needed improvement for a splashguard device for road vehicles and, while certain specific details have been disclosed for the purposes of the description, the invention is not considered limited thereto or thereby but only by the scope of the appended claims.

What is claimed is:

1. A splashguard for mounting on a road vehicle at a position rearwardly of at least one wheel to disperse liquid and other substances which may be sprayed rearwardly by the action of a rotating tire comprising:

a molded polymeric body having a substantially rectangular shape as may be defined by a top end adapted for mounting connection to the vehicle, a bottom end, and substantially parallel side members interconnecting the top and bottom ends;

a plurality of vane members interposed between the side members and integrally molded therewith in spaced-apart positions from the top end to the bottom end, each vane member being disposed at an acute angle with respect to a vertical plane of the body, said vane members each having a surface width extent defined by a leading marginal edge at a forward position in the body and a lower trailing marginal edge at a rearward position in the body, each vane member leading marginal edge being slightly higher than the trailing marginal edge of the above adjacent vane member; and a body fastening means mounting the splashguard on the vehicle at the top of the body.

2. The splashguard as claimed in claim 1 wherein the vanes are disposed at an acute angle within the range of 35°–55°.

3. The splashguard as claimed in claim 1 wherein the vanes are disposed at an acute angle within the range of 40°–50°.

4. The splashguard as claimed in claim 1 wherein the width extent of the body between the parallel side members is within the range of 20 inches to 30 inches.

5. The splashguard as claimed in claim 1 wherein the width extent of the body between the parallel side members is about 25 inches.

6. The splashguard as claimed in claim 1 wherein the top end has at least two mounting holes through it and the fastening means comprises a ring fastener carried within each of the holes.

7. The splashguard as claimed in claim 1 wherein the bottom end terminates in a concentration of structural material from which the body is made to provide a weight concentration at the bottom end of the body.

8. The splashguard as claimed in claim 1 wherein the side members extend a specific distance forwardly beyond the leading edges of the vane members to contain any substances which may be directed at the splashguard body within the area of the vanes.

9. The splashguard as claimed in claim 1 wherein the body, vane members, and body fastening means comprise an upper splashguard section and the splashguard further comprises:

a lower splashguard section having a molded polymeric body as may be defined by a top end, a bottom end, and parallel side members interconnecting the top and bottom ends; and a plurality of vane members interposed between the side members and integrally molded therewith in spaced-apart positions from the top end to the bottom end, each vane member being disposed at an acute angle with respect to a vertical plane of the body, said vane members each having a surface width extent defined by a leading marginal edge at a forward position and a lower trailing marginal edge at a rearward position in the body each vane member leading marginal edge being slightly higher than the trailing marginal edge of the above adjacent vane member, said lower splashguard section having its top end and a plurality of vane members removably attached to the upper splashguard section in a nested relationship with respect to the bottom end of the upper splashguard section and a plurality of its vane members.

10. The splashguard as claimed in claim 9 wherein the upper and lower splashguard sections each has a plurality of equally spaced-apart mounting holes through the side members and these have section fastening means through at least some of the holes which maintain the upper and lower sections in nested orientation, said sections being repositioned one with respect to the other by a reposition lug of the section fastening means.

11. The splashguard as claimed in claim 9 wherein the lower splashguard section is weighted at its bottom end.

12. The splashguard as claimed in claim 9 wherein the vane members of both the upper and lower splashguard sections are disposed at an acute angle within the range of 40°–50°.

13. The splashguard as claimed in claim 9 wherein the vane members of both the upper and lower splashguard sections are disposed at an acute angle of about 42°.

14. The splashguard as claimed in claim 9 wherein the side members of both the upper and lower splashguard sections are configured as U-shaped channels and the U-shaped channels of the lower section side members are nestable over the U-shaped channels of the upper section side meanders.

15. The splashguard as claimed in claim 14 wherein the U-shaped channels have inboard leg members to which the vane members are affixed and outboard leg members which extend beyond the leading edges of the vane members by a specific distance.

16. The splashguard as claimed in claim 9 wherein the bodies and vane members of the upper and lower splashguard sections are integrally molded of a polymeric material into separate unitary structures.

17. A splashguard for mounting on a road vehicle at a position rearwardly of at least one wheel to deflect liquid and other substances which may be sprayed rearwardly by the action of a rotating tire comprising:

a molded polymeric body of substantially rectangular and planar shape having a top end, a bottom end and a pair of substantially parallel spaced apart side members extending from the top end to the bottom end;

said body adapted to be mounted on the vehicle in a substantially vertical plane with one side facing forwardly toward the vehicle wheel and one side facing rearwardly away from the vehicle wheel;

a plurality of transversely extending spaced apart louvers interconnecting the side members and integrally molded therewith, said louvers positioned between the top end and the bottom end of the body and defining transversely extending open passageways therebetween;

each louver having a forwardly facing edge and a rearwardly facing edge and each louver being inclined an angle such that the forwardly facing edge is higher than the rearwardly facing edge, each louver forwardly facing edge being slightly higher than the rearwardly facing edge of the above adjacent louver; and fastening means for attaching the splashguard to the vehicle.

18. The splashguard as claimed in claim 17 wherein the louvers lie in parallel planes and extend substantially horizontally across the body in the longitudinal direction of the louvers.

19. The splashguard as claimed in claim 17 wherein the louvers form a chevron shaped pattern when viewed from either the forwardly facing or the rearwardly facing side of the body.

20. The splashguard as claimed in claim 17 wherein the louvers lie in parallel planes and extend across the body at an inclined angle in the longitudinal direction of the louvers wherein one end of each louver is higher than the opposite end.

21. The splashguard as claimed in claim 20 wherein the louvers are inclined longitudinally at an angle such that an outer end of each louver is highest and an inner end of each louver is the lowest when the body is mounted in operative position on a vehicle.

22. The splashguard as claimed in claim 17 wherein the louvers are curved in the longitudinal direction.

23. The spashguard as claim in claim 17 wherein each of the side members has a forwardly extending flange running substantially the entire length of such side member.

24. The spashguard as claimed in claim 17 wherein the body member is made of a separate top section and bottom section, said sections being of such a contour as to nest in overlapping relationship with each other and being connectable to each other at various selective lengths of overlap to provide a variable length body member.

* * * * *